FISH UNLOADING SYSTEM
Original Filed July 1, 1970
FIG. 1
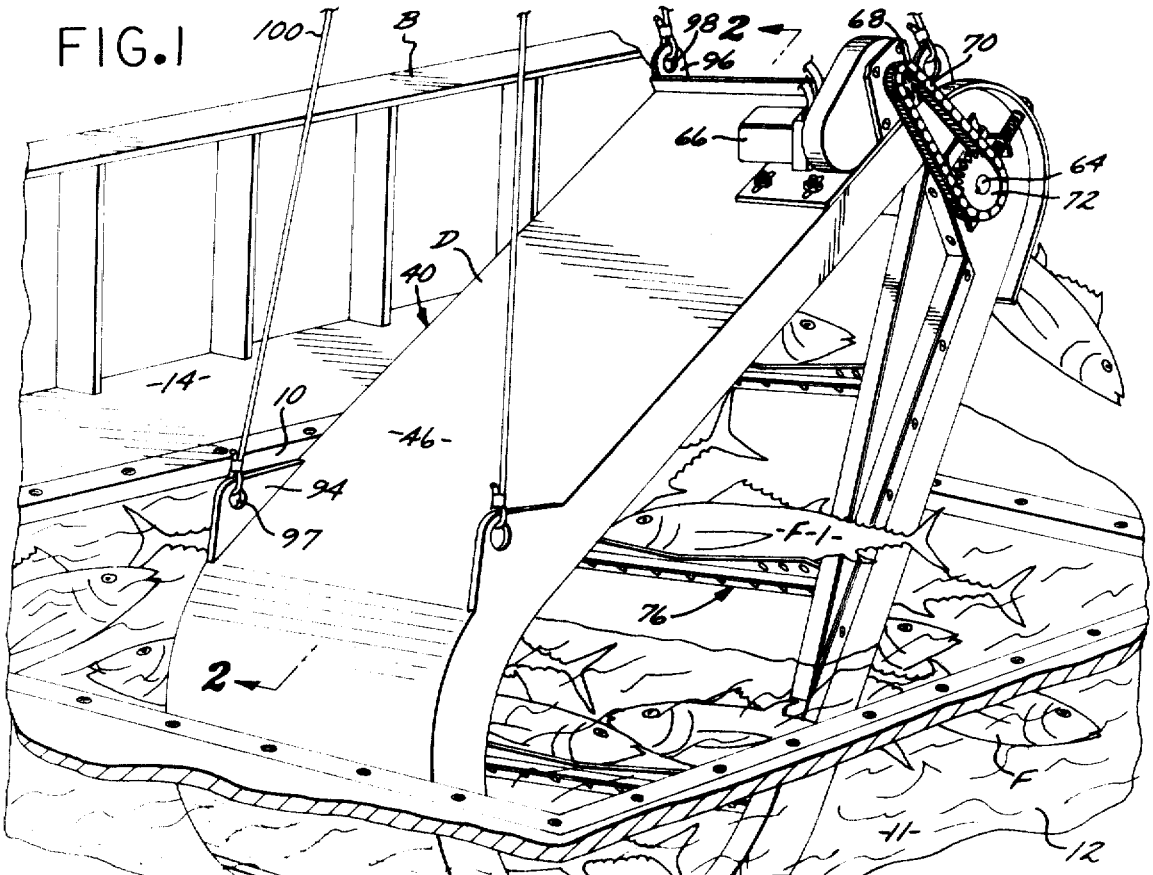
FIG. 3
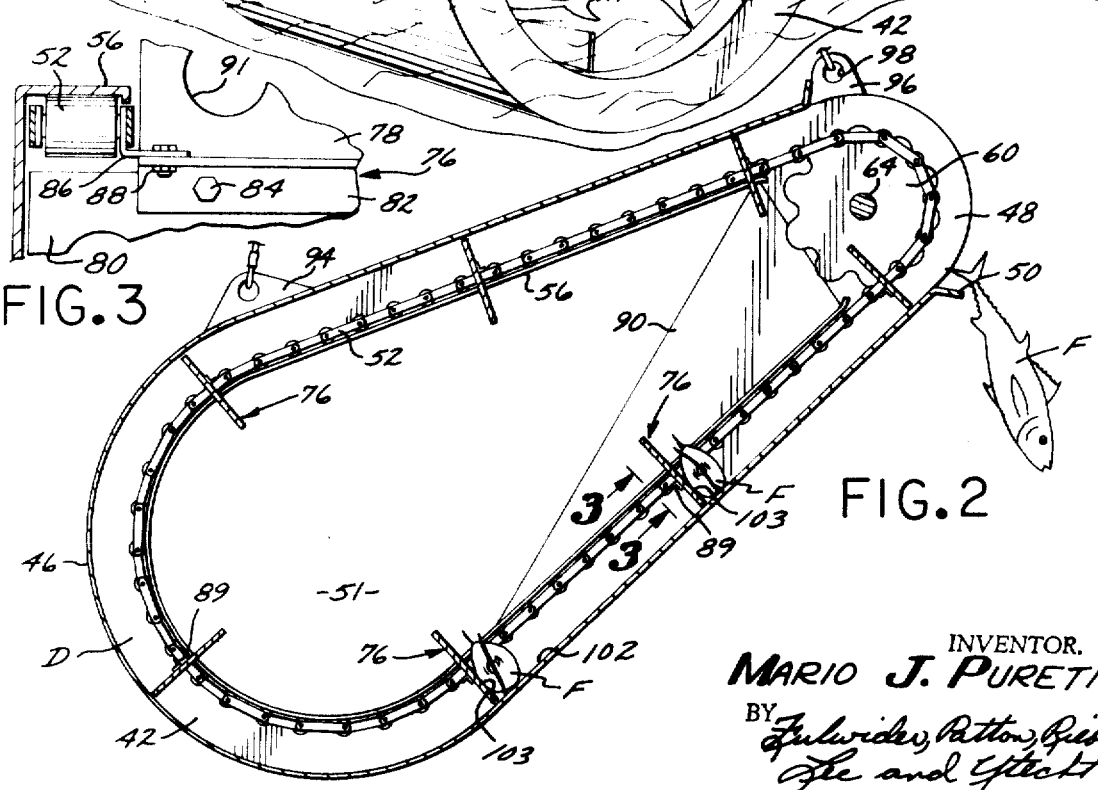
FIG. 2
INVENTOR.
MARIO J. PURETIC
BY Fulwider, Patton, Rieber, Lee and Utecht
ATTORNEYS United States Patent Office Re. 28,186
Reissued Oct. 1, 1974

28,186
FISH UNLOADING SYSTEM

Mario J. Puretic, 259 6th Ave. N., Monte Cristo Isle, Tierra Verde, Fla.

Original No. 3,625,383, dated Dec. 7, 1971, Ser. No. 51,573, July 1, 1970. Application for reissue Feb. 14, 1972, Ser. No. 226,205
Int. Cl. B63b *35/14*
U.S. Cl. 214—152 4 Claims

Matter enclosed in heavy brackets [ ] appears in the original patent but forms no part of this reissue specification; matter printed in italics indicates the additions made by reissue.

ABSTRACT OF THE DISCLOSURE

A fish unloading system for removing fish from the hold of a fishing boat. The fish hold is substantially filled with water and sufficient salt added to cause the fish to float near the surface of the water. A fish impelling device having an enclosure arranged in a loop with a discharge aperture formed in its upper portion is lowered into the upper portion of the hold. A power-driven chain looped about the interior of the enclosure drives a plurality of blades so as to continuously propell fish upwardly from the hold.

BACKGROUND OF THE INVENTION

Field of the Invention

The present invention relates generally to the art of fishing and more particularly to a novel system for unloading fish from the hold of a fishing boat.

Description of the Prior Art

Although fishing is one of the oldest arts, comparatively little has been done over the years to change the apparatus and methods that have been utilized in unloading fish from the hold of a fishing boat. Generally, fish are unloaded by means of a large bucket that is suspended from a hoist. Prior to the unloading operation the brine is removed from the hold. Thereafter, a crew of laborers descend into the hold and handload the bucket with fish. The loaded bucket is then raised through the hatch to the deck or to a dock. This unloading operation involves several disadvantages. Thus, it requires a comparatively large number of workmen. The conditions within the hold are extremely uncomfortable. The unloading operation requires many hours, with a resultant expensive tie-up time of the boat. Moreover, the workmen bruise and thereby damage the fish by contact with their feet. Where small fish are unloaded it is possible to pump the fish from the hold, This system, however, is only usable with smaller fish and the fish are generally rendered unfit for human consumption.

SUMMARY OF THE INVENTION

It is a major object of the present invention to completely eliminate the above set-forth disadvantages inherent to conventional unloading of fish from a fishing boat.

It is another object of the present invention to provide a fish unloading system wherein the fish are caused to float near the upper portion of the fish hold and are thereafter removed from such hold rapidly and without damage to the fish.

Yet a further advantage of the present invention is to provide a fish unloading system of the aforedescribed nature utilizing a fish impelling device that is economical of manufacture, compact, light in weight, and fool-proof of operation.

BRIEF DESCRIPTION OF THE DRAWINGS

FIG. 1 is a perspective view of a preferred form of fish unloading system embodying the present invention;

FIG. 2 is a vertical sectional view taken along line 2—2 of FIG. 1; and

FIG. 3 is a sectional view taken in enlarged scale along line 3—3 of FIG. 2.

DESCRIPTION OF THE PREFERRED EMBODIMENT

Referring to the drawings, there is shown a fishing boat B provided with a preferred form of fish unloading system embodying the present invention. This system utilizes a fish impeller device D shown extending through the hatch 10 of the fishing boat. The hatch 10 leads to the fish hold 12 of the boat B. Fish F are shown being withdrawn upwardly from the water 11 in hold 12 through the hatch 10 onto the deck 14 of the boat B.

A preferred form of fish impelling device D of the present invention includes an open-sided enclosure generally designated 40 that defines an elongated generally tear drop-shaped loop. The enclosure 40 may be formed of a suitable material such as metal, wood, synthetic plastic or a combination of these materials. Enclosure 40 includes a pair of like side frame elements 42 which are horizontally aligned. These side frame elements are provided with a cover 46. The upper portion of the cover 46 is open so as to define a fish-discharge aperture 48. Cover 46 is bent at the lower edge of aperture 48 to provide a retainer lip 50. The lower portion of the enclosure defines a fish intake 51.

A pair of like roller chains 52 are looped about the interior of the enclosure 40. As indicated particularly in FIG. 3, these chains are supported within generally U-shaped guides 56 formed on the side frames 42. The upper portion of the side frames 42 rotatably support a pair of sprockets 60 by means of a horizontal shaft 64, the sprockets being keyed to the shaft. The teeth of the sprockets 60 are engaged with the links of the two chains 52. The sprockets 60 are preferably driven by means of a hydraulic motor 66 of conventional construction mounted on the upper rear portion of enclosure 40. Alternatively, an electric motor may be employed. The drive shaft of the motor 66 is keyed to a pinion 68. The pinion 68 is in engagement with the links of a short drive chain 70. The links of drive chain 70 are also engaged with the teeth of a gear 72 keyed to one end of the shaft 64.

A plurality of like, elongated blades, generally designated 76, are attached to the chains 52 at spaced portions therealong. Each blade 76 includes an upper element 78 and a lower element 80. Each upper blade element 78 is provided with a stiffening angle 82 affixed to its respective upper blade element as by welding. The upper blade elements 78 are secured to the lower blade elements by means of a plurality of bolt and nut combinations 84 extending through the vertical web of angle 82. The outer edges of each stiffening angle 82 are secured to a generally L-shaped clip 86 by means of bolt and nut combinations 88. The free leg of each clip 86 is affixed to an inner inwardly-facing link of chains 52, as indicated particularly at 89 in FIG. 2 The upper portion of each upper blade element 78 extends inwardly and downwardly in a generally V-shaped configuration. The lower element 80 of each blade 76 extends outwardly below the chains 52 as shown in FIGS. 3 and 5. The lower edge of each lower blade element 80 rides just above the inwardly-facing surface of cover 46. The blades may be formed with apertures 91 for water drainage.

The side frames 42 are provided with a pair of like, aligned fish guides 90 of generally triangular configuration. As indicated in FIG. 2, the upper edges of the guides 90 extend upwardly and rearwardly relative to the lower run of the side frame elements 42.

The upper portion of the side frames 42 are provided with a pair of aligned lower support ears 94 and a pair of upper support ears 96. These support ears are formed with bores 97 and 98, respectively, that receive the four legs of a cable bridle 100.

In the operation of the fish unloading system of the present invention, the level of water or brine 11 in the hold 12 is raised if necessary until it reaches the upper portion of such hold. Thereafter, if necessary, the salinity of the water or brine is adjusted until the fish float near the water level in the hold. The brine pumps may be operated to circulate the brine water so as to accelerate salinity control. Next, the lower portion of the fish impelling device D is lowered through hatch 10 into the upper portion of the water 11 by means of the cable bridle 100 until the fish intake 51 is disposed within the upper portion of such water.

The motor 66 will then be operated so as to effect movement of the chains 52. As indicated in FIGS. 1 and 2, the lower run of the chains will move upwardly and rearwardly so as to effect concurrent movement of the blades 76. Blades 76 will propell fish F upwardly from within the lower portion of the enclosure 40 along the support surface 102 defined by the bottom wall of cover 46, the upwardly-facing surfaces of blades 76 defining impelling surfaces 103 that extend normal to such support surface. The fish F ultimately pass through the fish discharge aperture 48. In this manner the fish will be rapidly and continuously removed from the hold 12. The fish discharging from the aperture 48 may be directed into a conventional shute, conveyor or bucket for removal from the boat B. The brine pumps may be operated so as to aid continuous flow of the fish F into the intake 51 of the enclosure 40. Fish may also be directed into the enclosure intake 51 manually by means of an elongated rod or stick. It should be particularly noted that the removal of the fish from the hold 12 will not damage the fish in any way. The movement provided by the impeller blades is smooth and gentle so that the fish will not be bruised.

It should also be noted that the aforedescribed fish impelling device D incorporates means for automatically guiding the fish F towards the center of the blades 76 as the fish are being moved upwardly along the bottom wall of the enclosure 40. Thus, referring to FIG. 1, it will be noted that a fish F1 has its tail portion extending outwardly over the side of one of the side frames 42. As the tail portion of the fish engages the upper edge of the guide 90, it will be gradually forced upwardly because the upper edge of the guide 90 rises at a greater angle than the upper edge of the side frame 42. As the tail portion of the fish is thus raised, gravity will cause the fish to slide downwardly towards the interior of the enclosure. In this manner, the fish will gradually be forced away from the side frame until all or the majority of its tail portion is positioned within the confines of the enclosure.

Various modifications and changes may be made with respect to the foregoing detailed description without departing from the spirit of the present invention.

I claim:

1. A system of unloading fish from a hold of a fishing boat through a hatch of said boat, said system comprising:

substantially filling said hold with water;

adjusting the salinity of said water whereby said fish will float near the level thereof;

providing an upwardly inclined support surface that extends from below the level of said water through said hatch; and continuously power-moving a plurality of impelling surfaces that extend normal to said support surface upwardly over said support surface to thereby progressively urge fish upwardly out of said hold and through said hatch.

2. A system as set forth in Claim 1 wherein said water is circulated in said hold to aid in directing said fish onto said support surface.

*3. A system of unloading fish from a hold of a fishing boat through a hatch of said boat, said system comprising:*

*substantially filling said hold with water;*

*adjusting the salinity of said water whereby said fish will float near the level thereof;*

*providing an open-sided enclosure arranged in a loop and having a discharge aperture in its upper portion, and with the bottom wall of the enclosure defining an upwardly inclined fish support surface that extends out of said hold from said hatch;*

*introducing fish into the lower portion of said enclosure; and*

*continuously power-moving a plurality of impelling surfaces that extend normal to said support surface upwardly over said support surface to thereby progressively urge fish upwardly out of said hold and through said hatch.*

*4. A system of unloading fish from a hold of a fishing boat through a hatch of said boat, said system comprising:*

*providing an open-sided enclosure arranged in a loop and having top, bottom and end walls that are continuous with the bottom wall of the enclosure defining an upwardly inclined fish support surface that extends out of said hold from said hatch and is formed with a discharge aperture outside of said hatch, and with said enclosure having partial side walls extending about the periphery thereof;*

*introducing fish into the lower portion of said enclosure through the openings on each side defined by said partial side walls; and*

*continuously power-moving a plurality of impelling surfaces that extend normal to said enclosure walls about the interior of said enclosure to thereby progressively urge fish upwardly out of said hold and through said hatch.*

References Cited

The following references, cited by the Examiner, are of record in the patented file of this patent of the original patent.

UNITED STATES PATENTS

| | | | |
|---|---|---|---|
| 3,261,316 | 7/1966 | Puretic | 214—15 R |
| 1,573,785 | 2/1926 | Albright | 198—174 |
| 438,054 | 10/1890 | Bonneville | 198—174 |
| 2,357,796 | 9/1944 | Hapman | 198—172 |
| 3,104,756 | 9/1963 | Walker | 198—210 |
| 3,450,279 | 6/1969 | Yukawa | 214—15 B X |

FRANK E. WERNER, Primary Examiner